United States Patent
Ahn et al.

(10) Patent No.: US 10,785,733 B2
(45) Date of Patent: Sep. 22, 2020

(54) METHOD AND APPARATUS FOR REPORTING POWER HEADROOM

(71) Applicant: LG Electronics Inc., Seoul (KR)

(72) Inventors: Joonkui Ahn, Seoul (KR); Sukhyon Yoon, Seoul (KR); Suhwan Lim, Seoul (KR); Suckchel Yang, Seoul (KR); Jonghyun Park, Seoul (KR); Changhwan Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/858,012

(22) Filed: Apr. 24, 2020

(65) Prior Publication Data
US 2020/0252888 A1    Aug. 6, 2020

Related U.S. Application Data

(63) Continuation of application No. 16/672,248, filed on Nov. 1, 2019, now Pat. No. 10,660,050, which is a
(Continued)

(30) Foreign Application Priority Data

Apr. 12, 2018    (KR) .................. 10-2018-0042887

(51) Int. Cl.
*H04W 52/36*    (2009.01)
*H04W 52/14*    (2009.01)
(Continued)

(52) U.S. Cl.
CPC ....... *H04W 52/365* (2013.01); *H04W 52/146* (2013.01); *H04W 52/243* (2013.01);
(Continued)

(58) Field of Classification Search
CPC . H04W 52/365; H04W 52/44; H04W 52/367; H04W 52/243; H04W 52/146;
(Continued)

(56) References Cited

U.S. PATENT DOCUMENTS 8,744,513 B2 *  6/2014  Chen .................. H04W 52/367
                                                        455/522
8,798,663 B2    8/2014  Wang et al.
(Continued)

FOREIGN PATENT DOCUMENTS

KR    20110039172    4/2011
KR    20110104565    9/2011
(Continued)

OTHER PUBLICATIONS

Huawei, HiSilicon, "UL power control for short TTI", R1-1701738, 3GPP TSG RAN WG1 Meeting #88, Athens, Greece, Feb. 13-17, 2017, 4 pages.
(Continued)

*Primary Examiner* — Shaima Q Aminzay
(74) *Attorney, Agent, or Firm* — Fish & Richardson P.C.

(57) ABSTRACT

Provided are a method for reporting a power headroom and an apparatus using the same. The apparatus computes and reports a power headroom for a physical uplink shared channel (PUSCH) that is transmitted in a first transmission period of a first band having a first subcarrier interval. The power headroom is computed on the basis of at least one second transmission interval of a second band having a second subcarrier interval which overlaps with the first transmission interval.

10 Claims, 17 Drawing Sheets

Related U.S. Application Data continuation of application No. PCT/KR2018/005133, filed on May 3, 2018.

(60) Provisional application No. 62/501,057, filed on May 3, 2017, provisional application No. 62/519,844, filed on Jun. 14, 2017, provisional application No. 62/523,731, filed on Jun. 22, 2017, provisional application No. 62/543,342, filed on Aug. 9, 2017, provisional application No. 62/547,089, filed on Aug. 17, 2017, provisional application No. 62/560,623, filed on Sep. 19, 2017, provisional application No. 62/586,205, filed on Nov. 15, 2017, provisional application No. 62/586,171, filed on Nov. 15, 2017, provisional application No. 62/615,970, filed on Jan. 11, 2018, provisional application No. 62/630,715, filed on Feb. 14, 2018.

(51) Int. Cl.
*H04W 52/24* (2009.01)
*H04W 72/12* (2009.01)
*H04W 52/44* (2009.01)
*H04W 52/54* (2009.01)
*H04W 52/28* (2009.01)

(52) U.S. Cl.
CPC ....... *H04W 52/281* (2013.01); *H04W 52/367* (2013.01); *H04W 52/44* (2013.01); *H04W 52/54* (2013.01); *H04W 72/1289* (2013.01)

(58) Field of Classification Search
CPC ............. H04W 72/1289; H04W 52/54; H04W 52/281; H04W 52/38; H04W 52/34
USPC ....................................................... 455/522
See application file for complete search history.

(56) References Cited

U.S. PATENT DOCUMENTS

| 2013/0136110 A1 | 5/2013 | Yamamoto et al. |
| 2014/0198765 A1 | 7/2014 | Krishnamurthy et al. |

FOREIGN PATENT DOCUMENTS

| KR | 20140024928 | 3/2014 |
| KR | 20140116435 | 10/2014 |
| KR | 20150105329 | 9/2015 |
| KR | 20160062098 | 6/2016 |
| KR | 20160100818 | 8/2016 |

OTHER PUBLICATIONS

InterDigital Communications, "Power Headroom Reporting for NR," R2-1703090, 3GPP TSG-RAN WG2 #97bis, Spokane, Washington, dated Mar. 25, 2017, 4 pages.
Huawei. HiSilicon, "Uplink power control," R1-162631, 3GPP TSG RAN WG1 Meeting #84bis, Busan, Korea, dated Apr. 11-15, 2016, 4 pages.
Korean Notice of Allowance in Korean Application No. 10-2020-7011524, dated May 3, 2020, 5 pages (with English translation).
Korean Notice of Allowance in Korean Application No. 10-2020-7013861, dated Jun. 23, 2020, 5 pages (with English translation).
LG Electronics, "Discussion on UL power control for NR," R1-1611831, 3GPP TSG RAN WG1 Meeting #87, Reno, USA, dated Nov. 14-18, 2016, 5 pages.
LG Electronics, "Discussion on uplink power control for NR," R1-1704895 3GPP TSG RAN WG1 Meeting #88bis, Spokane, USA, dated Apr. 3-7, 2017, 5 pages.
LG Electronics, "Uplink power control for dual connectivity" R1-142141, 3GPP TSG RAN WG1 Meeting #77, Seoul, Korea, dated May 19-23, 2014, 6 pages.
NTT Docomo, Inc., "Uplink power control considering waveform switching," R1-1700601, 3GPP TSG-RAN WG1-NR, Spokane, USA, dated Jan. 16-20, 2017, 2 pages.

* cited by examiner

METHOD AND APPARATUS FOR REPORTING POWER HEADROOM

CROSS-REFERENCE TO RELATED APPLICATIONS

This application is a continuation of U.S. application Ser. No. 16/672,248, filed on Nov. 1, 2019, which is a continuation pursuant to 35 U.S.C. § 119(e) of International Application PCT/KR2018/005133, with an international filing date of May 3, 2018, which claims the benefit of U.S. Provisional Patent Applications No. 62/501,057, filed on May 3, 2017, No. 62/519,844, filed on Jun. 14, 2017, No. 62/523,731, filed on Jun. 22, 2017, No. 62/543,342, filed on Aug. 9, 2017, No. 62/547,089, filed on Aug. 17, 2017, No. 62/560,623, filed on Sep. 19, 2017, No. 62/586,205, filed on Nov. 15, 2017, No. 62/586,171, filed on Nov. 15, 2017, No. 62/615,970, filed on Jan. 11, 2018, No. 62/630,715, filed on Feb. 14, 2018 and Korean Patent Application No. KR10-20180042887, filed on Apr. 12, 2018. The disclosures of the prior applications are incorporated by reference in their entirety.

BACKGROUND

Field

The present disclosure relates to wireless communication, and more particularly, to a method of reporting a power headroom in a wireless communication system, and an apparatus using the method.

Related Art

In the 3rd generation partnership project (3GPP), the overall timeline and concept for 5G standardization were agreed in the workshop held in September 2015. Enhanced mobile broadband (eMBB), massive machine type communications, ultra-reliable and low latency communication (URLLC), or the like has been defined as a top-level use-case. To satisfy a service scenario and a new requirement, the 3GPP has determined to define a new radio (NR) different from the existing long term evolution (LTE), and has defined both the LTE and the NR as a 5G radio access technique.

Uplink transmit (TX) power is controlled to reduce battery consumption of terminals and to mitigate interference caused by uplink transmission between the terminals. With the introduction of the terminal and base station supporting a more flexible bandwidth and channel structure, there is a need to effectively control the uplink TX power.

SUMMARY

The present disclosure provides a method for reporting a power headroom and a device using the method.

In an aspect, a method for reporting a power headroom in a wireless communication system includes computing a power headroom for a physical uplink shared channel (PUSCH) which is transmitted in a first transmission period of a first band having a first subcarrier spacing, and reporting the power headroom. The power headroom is computed based on at least one second transmission period of a second band having a second subcarrier spacing, the at least one second transmission period overlapping with the first transmission period.

In another aspect, a device for reporting a power headroom in a wireless communication system includes a transceiver configured to transmit and receive a radio signal, and a processor operatively coupled to the transceiver. The processor is configured to compute a power headroom for a physical uplink shared channel (PUSCH) which is transmitted in a first transmission period of a first band having a first subcarrier spacing, and report the power headroom via the transceiver. The power headroom is computed based on at least one second transmission period of a second band having a second subcarrier spacing, the at least one second transmission period overlapping with the first transmission period.

Battery consumption of a device can be reduced, and interference caused by uplink transmission can be mitigated.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present disclosure is applied according to a 3rd generation partnership project (3GPP) long term evolution (LTE) based on 3GPP technical specification (TS). However, this is for exemplary purposes only, and thus the present disclosure is also applicable to various wireless communication networks.

In 3GPP LTE, a downlink (DL) physical channel may include a physical downlink control channel (PDCCH), a physical control format indicator channel (PCFICH), a physical hybrid-ARQ indicator channel (PHICH), and a physical downlink shared channel (PDSCH). An uplink (UL) physical channel may include a physical uplink control channel (PUCCH) and a physical uplink shared channel (PUSCH). Control information transmitted through the PDCCH is referred to as downlink control information (DCI). The DCI may include resource allocation (also referred to as a DL grant) of the PDSCH or resource allocation (also referred to as a UL grant) of the PUSCH.

New radio (NR) which is a 5G radio access technique supports various bandwidths and frequency bands for more flexible scheduling. Not only a frequency band below 6 GHz but also a frequency band above 6 GHz is supported. A supported bandwidth is up to 100 MHz at 6 GHz or below and up to 400 MHz at 6 GHz or above. In addition, unlike 3GPP LTE fixed to a subcarrier spacing of 15 kHz, the NR may support a variety of subcarrier spacing of 15 kHz, 30 kHz, 60 kHz, 120 KHz, or 240 kHz.

Figure 1:
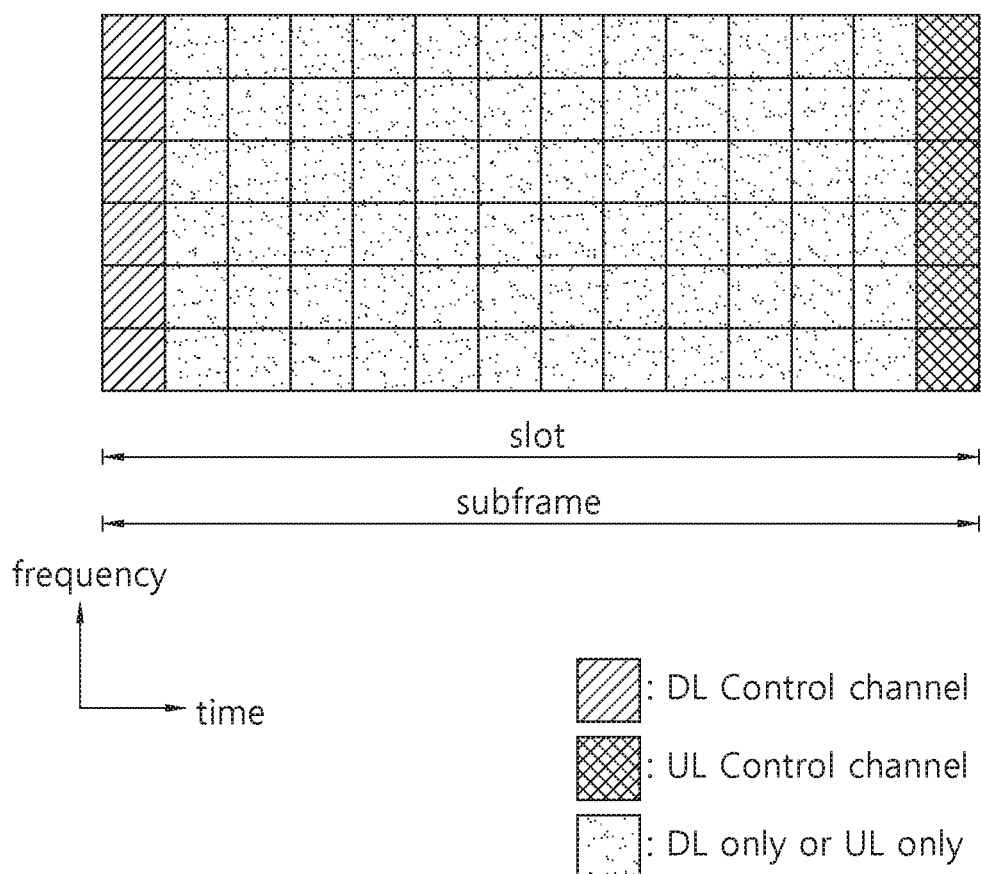
FIG. 1 shows an example of a subframe structure to which the present disclosure is applied.

FIG. 1 shows an example of a subframe structure to which the present disclosure is applied.

A subframe is a unit indicating a transmission time interval (TTI), and indicates, for example, a transmission interval of 1 ms. A slot is a unit of scheduling. For example, one slot may include 14 orthogonal frequency division multiplexing (OFDM) symbols. When a subcarrier spacing is 15 kHz, 14 OFDM symbols in one slot correspond to 1 ms. If the subcarrier spacing is 30 kHz, the slot still includes 14 OFDM symbols, but the subframe includes 2 slots.

The slot is divided into at least three regions in a time domain. A DL control region is a region for transmitting a DL control channel. A UL control channel is a region for transmitting a UL control channel. A data region is a region for transmitting the DL data channel or the UL data channel. The number of OFDM symbols and locations thereof for each region are for exemplary purposes only. For example, the UL control region may be disposed to a first OFDM symbol of a first slot or a first OFDM symbol of a second slot.

A switching period for switching from a transmission mode to a reception mode may be configured between the respective regions. For example, at least one OFDM symbol between a UL control region and a data region for DL data may be configured as a guard period (GP) to play a role of the switching period.

In one slot, DL transmission and UL transmission are performed sequentially. A wireless device may receive DL data in one slot, and may also transmit hybrid automatic repeat request (HARD) ACK/NACK. Accordingly, even if the received DL data has an error, a time required to receive retransmission data is decreased, thereby minimizing data transfer latency.

Figure 2:
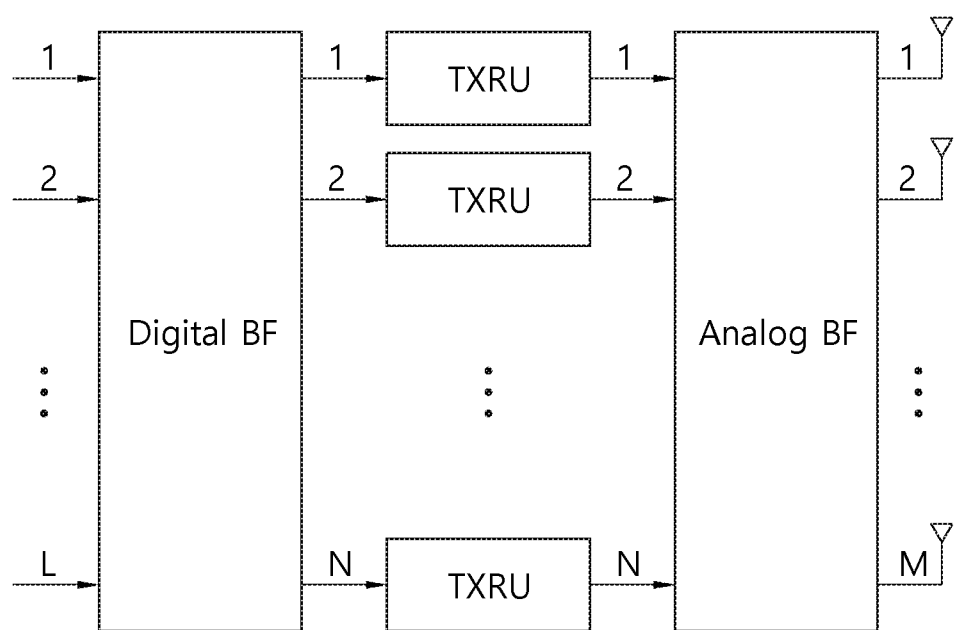
FIG. 2 shows an example of hybrid beamforming.

FIG. 2 shows an example of hybrid beamforming.

New radio (NR) may operate also at a frequency band above 6 GHz. Since a wavelength becomes short at a high frequency band, more antenna elements can be installed in the same area. For example, a wavelength is λ=1 cm at a band of 30 GHz. 100 antenna elements can be installed in total in a form of a two-dimensional array with an interval of λ/2 on a panel of 5 by 5 cm. An increase in the number of antenna elements may result in an increase in a beamforming gain, an increase in coverage, or an increase in a throughput.

A transceiver unit (TXRU) disposed to each antenna element enables transmit (TX) power and phase adjustment, and independent beamforming is possible for each frequency resource. However, it may be less cost effective when the TXRU is installed at all of about 100 antenna elements. A method may be considered in which a plurality of antenna elements are mapped to one TXRU, and a beam direction is adjusted with an analog phase shifter. Since only one beam direction is possible at a full band in this analog beamforming scheme, frequency selective beamforming cannot be performed.

Hybrid beamforming (BF) for mapping N TXRUs to M antenna elements may be considered with an intermediary form of digital BF and analog BF. Herein, M>N. In this case, although there is a difference according to a method of connecting the TXRU and the antenna element, the number of beam directions capable of simultaneous transmission is limited to be less than or equal to N. The analog BF of the hybrid BF implies an operation of performing precoding (or combining) in a radio frequency (RF) end.

In the hybrid BF having N TXRUs and M antenna elements, digital BF for L data layers to be transmitted may be expressed by an N by L matrix. Converted N digital signals are converted into analog signals through N TXRUs and thereafter analog BF expressed by an M by N matrix is applied. In this case, the number of digital beams may be L, and the number of analog beams may be N. Further, an NR system considers a design in which a BS can change analog BF on a symbol basis to support more effective BF for a UE located in a specific region. When N TXRUs and M antenna elements are defined as one antenna panel, the NR system also considers a method of introducing a plurality of antenna panels capable of applying independent hybrid BF.

As described above, the NR system supports flexible UL scheduling by allowing PUSCH and PUCCH transmission configured with various numbers of symbols even in a default time unit. Analog BF is also applied to UL transmission to increase transmission efficiency through an optimal RX-TX beam pair. Since a single carrier-frequency division multiplexing (SC-FDM) scheme and an OFDM scheme are both supported in PUSCH transmission, a UL waveform having a different peak-to-average power ratio (PAPR) characteristic may be selected according to coverage of the wireless device. A waveform with a low PAPR and a waveform with a high PAPR but supporting a high transfer rate are also both supported in PUCCH transmission.

Hereinafter, the following terms are used for convenience.

UL beam pair: combination of a UL TX beam transmitted by a wireless device and a UL RX beam received by a BS SC-FDM PUSCH: SC-FDM is a scheme in which a modulation symbol set is subjected to discrete Fourier transform (DFT) precoding, followed by inverse fast Fourier transform (IFFT). It is a PUSCH transmitted in a form of a waveform with a low PAPR.

OFDM PUSCH: PUSCH transmitted in such a manner that a modulation symbol set is subjected to IFFT without DFT precoding.

Sequence PUCCH: PUCCH transmitted in a form of one or a plurality of sequences with a low PAPR.

OFDM PUCCH: PUCCH transmitted in a form of performing IFFT on a modulation symbol set.

L-PUCCH: PUCCH transmitted through a relatively great number of OFDM symbols (e.g., 4 OFDM symbols or more) in one slot or transmitted across a plurality of slots.

S-PUCCH: PUCCH transmitted through a relatively small number of OFDM symbols (e.g., 2 OFDM symbols or less).

Different PUCCH formats refer to PUCCH formats which are distinct by the number of symbols, a bandwidth, a modulation type (e.g., a sequence PUCCH and an OFDM PUCCH), a channel coding scheme, or the like.

Now, methods of controlling UL power in various UL transmission environments are proposed.

Figure 3:
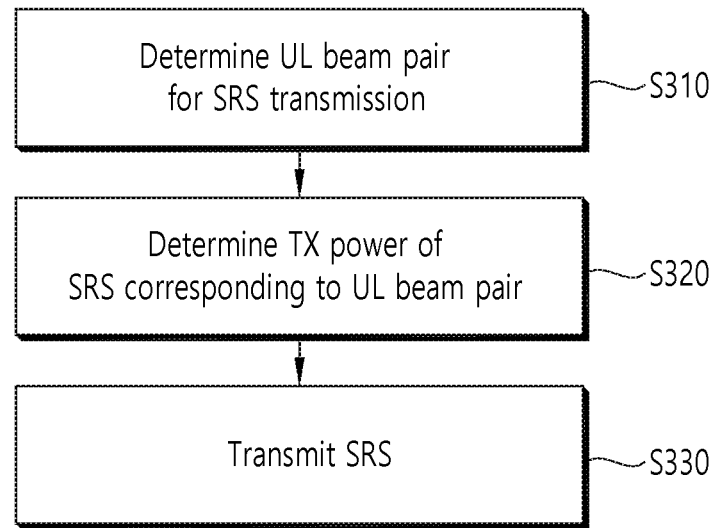
FIG. 3 shows transmission of a sounding reference signal according to an embodiment of the present disclosure.

FIG. 3 shows transmission of a sounding reference signal according to an embodiment of the present disclosure.

In step S310, a wireless device determines a UL beam pair for sounding reference signal (SRS) transmission. In step S320, the wireless device determines TX power of an SRS corresponding to the UL beam pair. In step S330, the wireless device transmits the SRS according to the determined TX power.

The SRS may be used by a BS to measure UL channel quality for UL scheduling or may be used for beam selection/refinement of between the BS and the wireless device. When the wireless device transmits the SRS through different TX beams at different timing or transmits the SRS through the same TX beam at different timing, the BS applies a different RX beam to each SRS transmission to measure RX quality. The BS may select the best UL beam pair to utilize it in communication with the wireless device. For convenience, the SRS transmitted for each UL beam pair is called bSRS.

If suitable UL power control is applied to each UL beam pair, bSRS TX power may be optimized for each UL beam pair. However, there is an increase in a complexity and signaling overhead for performing power control for each UL beam pair. For a specific UL beam pair, the BS may have to transmit the bSRS when a control right is lost or before the control right is obtained. Even if power control is maintained for a plurality of UL beam pairs, in order to fairly compare link efficiency for the plurality of UL beam pairs, it may be effective to adjust TX power of the bSRS to the same level with respect to each UL beam pair.

Accordingly, the present embodiment proposes a scheme for UL power control for a plurality of UL beam pairs. Hereinafter, when it is referred to as a 'UL beam pair', both an RX beam of the BS and a TX beam of the wireless device may be considered, or only the TX beam of the wireless device may be considered while ignoring the RX beam of the BS. The bSRS corresponding to each UL beam pair transmitted by the wireless device may be divided through time, frequency, sequences, or the like.

In a first embodiment, TX power of a bSRS corresponding to a UL beam pair may be configured based on TX power of a bSRS corresponding to a UL reference beam pair.

Assume that a bSRS corresponding to an i-th UL beam pair (it is called UL BP(i)) is bSRS(i). Herein, i=1, . . . , K. K may be the total number of all UL beam pairs that can be formed by the wireless device. Alternatively, K may be the number of beam pairs in a beam pair group that can be formed by the wireless device. TX power of bSRS(i) may be configured based on TX power of bSRS(j). Herein, $1<=j<=K$. UL BP(j) denotes a UL reference beam pair. The UL reference beam pair may be applied to all UL beam pairs that can be formed by the wireless device. Alternatively, the UL reference beam pair may be applied for each UL beam pair group that can be formed by the wireless device.

The UL reference beam pair may be defined in the following manner.

(i) The BS informs the wireless device of information on the UL reference beam pair through RRC signaling or the like.

(ii) When the BS triggers bSRS transmission for a plurality of UL beam pairs through DL control information (DCI), the DCI may include the information on the UL reference beam pair.

(iii) A UL beam pair used for current (or most recent) UL transmission or the like among the plurality of UL beam pairs may be configured as the UL reference beam pair.

(iv) A UL beam pair for the smallest (or second smallest) bSRS TX power among the plurality of UL beam pairs may be configured as the UL reference beam pair. As a criterion for selecting the smallest bSRS TX power, some of elements for determining final TX power of the bSRS may be used. As a criterion for selecting the smallest bSRS TX power, a portion corresponding to TX power accumulated by a closed loop power control command may be used.

(v) A UL beam pair for the greatest (or second greatest) bSRS TX power among the plurality of UL beam pairs may be configured as the UL reference beam pair. As a criterion for selecting the greatest bSRS TX power, some of elements for determining final TX power of the bSRS may be used. As a criterion for selecting the greatest bSRS TX power, a portion corresponding to TX power accumulated by a closed loop power control command may be used.

In the above schemes (i) to (v), when it is said that TX power of bSRS(j) is configured based on bSRS(j), it may mean that the TX power of bSRS(j) is directly applied or a power offset is applied to bSRS(j), or a power value accumulated by a closed loop power control command is applied.

The TX power of bSRS(j) may be determined based on an average value of TX power required for a plurality of UL beam pairs.

bSRS(j) may mean a TX power value required when SRS/PUSCH is transmitted for UL BP(j) or an offset for the TX power value.

In a second embodiment, bSRS TX power corresponding to a beam pair may be configured based on a path loss corresponding to a specific DL beam.

In general, TX power of a physical channel to be applied to UL BP(i) may include a power component which compensates for a UL path loss of UL BP(i). Since it is difficult for the wireless device to directly measure the UL path loss, a path loss value measured through a DL beam pair corresponding to UL BP(i) may be considered as the UL path loss. The path loss value for the DL beam pair may be obtained by measuring RX power through an RX beam for a DL reference signal which is distinct for each TX beam.

A UL path loss value for configuring TX power of bSRS(i) may be determined based on a path loss value of a DL reference beam pair (or a DL reference beam when an RX beam of the wireless device is not additionally distinct).

The DL reference beam pair may be distinct according to a time/frequency domain in which the DL reference signal is transmitted, and may be determined in the following manner.

(i) The BS informs the wireless device of information on the DL reference beam pair through RRC signaling or the like.

(ii) When the BS triggers bSRS transmission for a plurality of UL beam pairs through DCI, the DCI may include the information on the DL reference beam pair.

(iii) A DL beam pair corresponding to a UL beam pair used for current (or most recent) UL transmission or the like among the plurality of UL beam pairs may be configured as the DL reference beam pair.

(iv) A DL beam pair corresponding to a UL beam pair for the smallest (or second smallest) bSRS TX power among the plurality of UL beam pairs may be configured as the DL reference beam pair.

(v) A DL beam pair corresponding to a UL beam pair for the greatest (or second greatest) bSRS TX power among the plurality of UL beam pairs may be configured as the DL reference beam pair.

In the above schemes (i) to (v), bSRS(i) may mean a TX power value required when transmitting an SRS or PUSCH of a j-th beam pair or an offset for the TX power value.

More specifically, TX power of bSRS(i) corresponding to UL BP(i) at an SRS transmission period q may be determined as follows. Herein, the SRS transmission period may correspond to a slot or a subframe.

$$P_{bSRS}(q, i) = \min\left\{ \begin{array}{l} P_{CMAX}(q), \\ P_{offset}(i) + 10\log_{10}(2^{\mu}M_{SRS}(q)) + \alpha(i)PL(i) + h(q) \end{array} \right\}$$ [Equation 1]

Herein, $P_{CMAX}(q)$ is maximum TX power configured to the wireless device in the SRS transmission period q, $P_{offset}(i)$ is a parameter configured by higher layer signaling for UL BP(i), $M_{SRS}(q)$ is a bandwidth allocated for SRS transmission in the SRS transmission period q, $\alpha(i)$ is a parameter configured by higher layer signaling for UL BP(i), PL(i) is a DL path loss estimation value calculated by the wireless device for UL BP(i), and h(q) is a parameter defined in the SRS transmission period q. $\mu$ is a value which increases as a subcarrier spacing of the SRS increases. In the above equation, UL BP(i) may be referred to as an SRS resource set defined for SRS transmission.

A UL beam pair may correspond to a relation of a UL transmission beam corresponding to a DL RX beam direction in which quality of a DL RX signal (e.g., SINR) is optimized. A TX beam may mean a TX spatial filter pattern, and an RX beam may mean an RX spatial filter pattern. From a perspective of the wireless device, different DL TX beams are not directly recognized, but may be recognized through different DL reference signal resources. A UL RX beam is dependent on an implementation of the BS, and thus may not be directly recognized by the wireless device.

Figure 4:
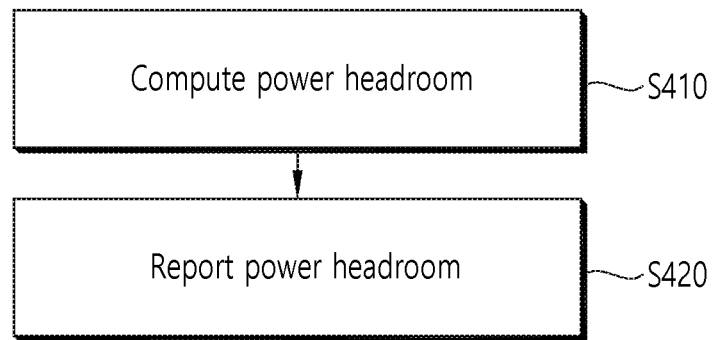
FIG. 4 shows a method of reporting a power headroom according to an embodiment of the present disclosure.

FIG. 4 shows a method of reporting a power headroom according to an embodiment of the present disclosure.

A power headroom (PH) is for providing information on a difference between maximum TX power of a wireless device and power estimated for UL transmission. A power headroom report (PHR) may be periodically triggered, or may be triggered by an instruction of a BS.

The equation below shows an example in which the wireless device calculates the PH in a transmission period q.

$$PH(q)=P_{CMAX}(q)-\{10 \log_{10}(M_{PUSCH}(q))+P_{O\_PUSCH}(j)+\alpha(j)PL+\Delta_{TF}(q)+f(q)\}$$ [Equation 2]

Herein, $P_{CMAX}(q)$ is a configured maximum TX power configured to the wireless device in the transmission period q, $M_{PUSCH}(q)$ is a bandwidth allocated for PUSCH transmission in the transmission period q, $P_{O\_PUSCH}(j)$ and $\alpha(j)$ are parameters, PL(i) is a DL path loss estimation value calculated by the wireless device, and $\Delta_{TF}(q)$ and f(q) are parameters.

In NR, UL channels having various waveforms may be transmitted, such as an SC-FDM PUSCH, an OFDM PUSCH, a sequence PUCCH, an OFDM PUCCH, or the like. When the UL channels having various waveforms are transmitted, the wireless device may calculate a PH by assuming that a specific waveform is transmitted.

In the presence of a plurality of waveforms that can be transmitted by the wireless device, the wireless device may calculate the PH, based on TX power under the assumption that a specific waveform is transmitted, irrespective of a waveform transmitted in practice. For example, even if the wireless device transmits an SC-FDM PUSCH or an OFDM PUSCH according to scheduling of the BS, the PH can be calculated by obtaining $P_{CMAX}(q)$ under the assumption that a reference waveform is transmitted. The reference waveform may be an OFDM PUSCH having a relatively greater PAPR characteristic and having a smaller PH range. Alternatively, the reference waveform may be an SC-FDM PUSCH having a greater PH range. The BS may provide information on the reference waveform which is a criterion for calculating the PH.

Similarly, even if the wireless device transmits a sequence PUCCH or an OFDM PUCCH according to scheduling of the BS, the PH can be calculated under the assumption that the reference waveform is transmitted. The reference waveform may be an OFDM PUCCH having a relatively greater PAPR characteristic and having a smaller PH range. Alternatively, the reference waveform may be a sequence PUSCH having a greater PH range. The BS may provide information on the reference waveform which is a criterion for calculating the PH.

Now, a PH report for different UL beam pairs is proposed.

When UL transmission is performed through a plurality of UL beam pairs between a BS and a wireless device, the wireless device may report a PH for a PUSCH/PUCCH independently for each UL beam pair. The wireless device may report all PHs for associated one or more UL beam pairs when reporting a PH for any PUSCH transmission.

If the wireless device always reports the PH for the plurality of UL beam pairs, a signaling overhead for the PH report may increase. Therefore, the wireless device may compute the PH by assuming a designated UL reference beam pair among the plurality of UL beam pairs. The UL reference beam pair may be configured as follows.

(i) It is configured by the BS through RRC signaling or DCI which schedules a PUSCH.

(ii) A UL beam pair designated to be used by the wireless device for PUSCH or PUCCH transmission.

(iii) A UL beam pair of which a PH value is the (second) smallest value among the plurality of UL beam pairs. The wireless device may report an index of a corresponding UL beam pair to the BS.

(iv) A UL beam pair of which a PH value is the (second) greatest value among the plurality of UL beam pairs. The wireless device may report an index of a corresponding UL beam pair to the BS.

(v) A UL beam pair transmitted last by the wireless device (in a corresponding carrier or cell) or scheduled from the BS.

The wireless device may calculate and report a PH value while changing the UL reference beam pair according to a determined period or order.

Assume that a PH for a UL reference beam pair is a reference PH. The wireless device may report a difference between the reference PH and a PH for another UL beam pair.

The above schemes may be applied to perform PHR for a corresponding carrier or band part, not only for a case where the wireless device transmits a PUCCH or the PUSCH in practice but also for a case where the wireless device does not transmit the PUCCH or the PUSCH through any carrier or a specific band part in a system band.

Now, a method for computing a PH when a PUSCH is transmitted simultaneously with a plurality of PUCCHs in a transmission period is proposed.

In the conventional 3GPP LTE, PUSCH/PUCCH transmission is scheduled in unit of a subframe, and a PH is calculated by assuming PUSCH/PUCCH transmission in one subframe. However, in NR, an L-PUCCH and an S-PUCCH are introduced, which can be transmitted also in unit of a slot or 2 to 3 OFDM symbols. Accordingly, also in one subframe, the PUSCH and the PUCCH may be transmitted in different OFDM symbols. Therefore, there is a need to calculate an independent PH.

Figure 5:
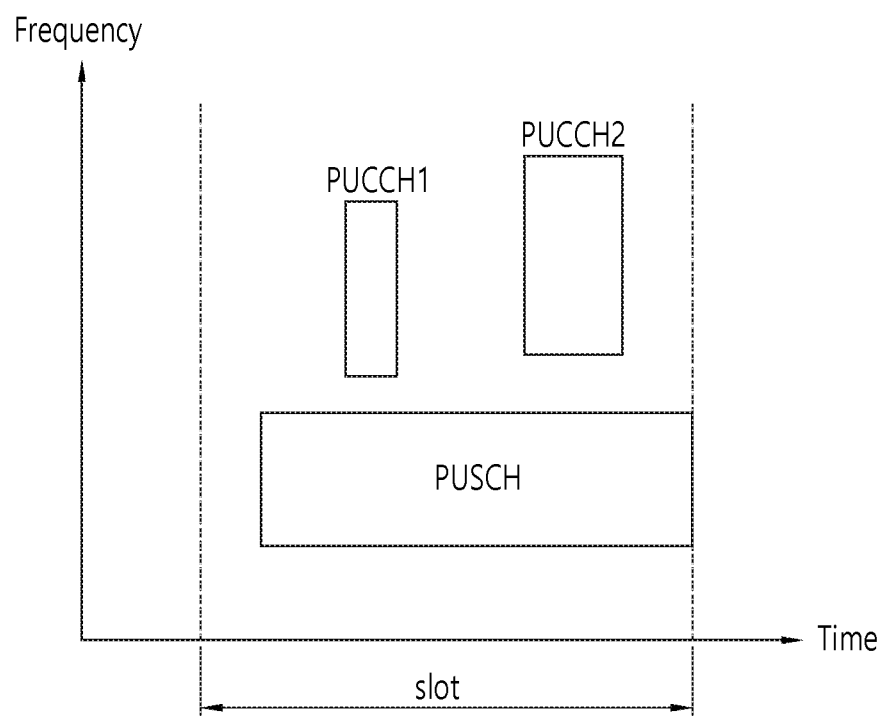
FIG. 5 shows an example of simultaneous transmission of a physical uplink shared channel (PUSCH) and a plurality of physical uplink control channels (PUCCHs).

FIG. 5 shows an example of simultaneous transmission of a PUSCH and a plurality of PUCCHs.

The PUSCH is transmitted in one slot or one or more OFDM symbols. In addition, a PUCCH1 and a PUCCH2 are transmitted in different OFDM symbols in a slot. A wireless device may calculate and report a PH by using at least one of the following schemes.

(i) The PH is reported for each of all PUCCH transmissions overlapping with PUSCH transmission. To which PUCCH format the PH belongs may be reported together.

A PH1 is calculated by considering simultaneous transmission of the PUSCH and a PUCCH1. A PH2 is calculated by considering simultaneous transmission of the PUSCH and a PUCCH2. Herein, the PH1 and the PH2 are both reported. For example, the PH1 is calculated by considering simultaneous transmission of the PUSCH and the PUCCH1, and the PH2 is calculated by considering the PUSCH and the PUCCH2. The wireless device reports both the PH1 and the PH2.

(ii) The smallest PH is reported among PUCCH transmissions overlapping with PUSCH transmission. To which PUCCH format the PH belongs may be reported together. For example, a smaller PH is reported between the PH1 and the PH2.

(iii) The greatest PH is reported among PUCCH transmissions overlapping with PUSCH transmission. To which PUCCH format the PH belongs may be reported together.

(iv) A PH is reported based on temporally first (or last) PUCCH transmission among PUCCH transmissions overlapping with PUSCH transmission. To which PUCCH format the PH belongs to may be reported together. For example, a greater PH is reported between the PH1 and the PH2.

(v) Only a PH without considering PUCCH transmission is reported.

(vi) A PH assuming transmission of a predetermined specific PUCCH format is reported.

Figure 6:
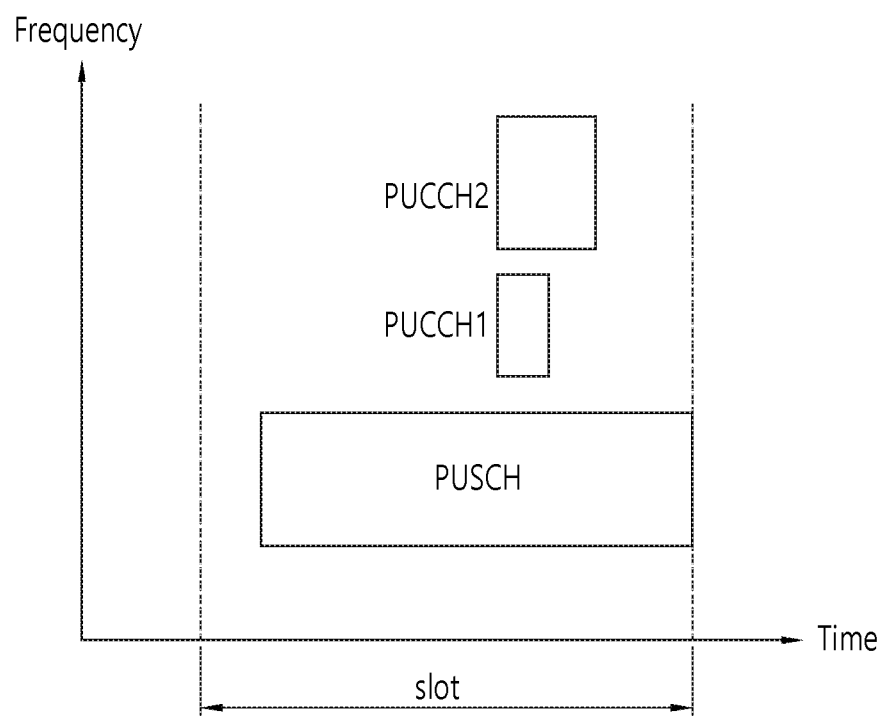
FIG. 6 shows another example of simultaneous transmission of a PUSCH and a plurality of PUCCHs.

FIG. 6 shows another example of simultaneous transmission of a PUSCH and a plurality of PUCCHs.

This is a case where PUCCH2 transmission overlaps with PUCCH1 transmission in one or more OFDM symbols. The wireless device may calculate and report a PH by using at least one of the following schemes.

(i) A PH considering all PUCCH transmissions overlapping with PUSCH transmission is reported. To which PUCCH format the PH belongs may be reported together. For example, the wireless device calculates and reports one PH by considering the PUSCH and the PUCCH1/PUCCH1.

(ii) The smallest PH is reported among PUCCH transmissions overlapping with PUSCH transmission. To which PUCCH format the PH belongs may be reported together.

(iii) The greatest PH is reported among PUCCH transmissions overlapping with PUSCH transmission. To which PUCCH format the PH belongs may be reported together.

(iv) Only a PH without considering PUCCH transmission is reported.

(v) A PH assuming a predetermined specific PUCCH format is reported.

The PH may be reported according to a type of simultaneous transmission of the PUCCH and the PUSCH as in the embodiments of FIG. 5 and FIG. 6. Alternatively, however, a slot may be divided into a plurality of symbol durations, and the PH may be reported for each symbol duration. Specifically, for example, a slot may be divided into a first symbol duration capable of transmitting an S-PUCCH (e.g., 1 or 2 symbol PUCCHs) and a second symbol duration capable of transmitting an L-PUCCH (a PUCCH transmitted in more symbols than the S-PUCCH), and the PH may be reported for each symbol duration.

When the PUSCH and the PUCCH are transmitted through different OFDM symbols in the same slot, the wireless device may calculate and report the PH by assuming that the PUCCH and the PUSCH are transmitted in the same OFDM symbol.

Figure 7:
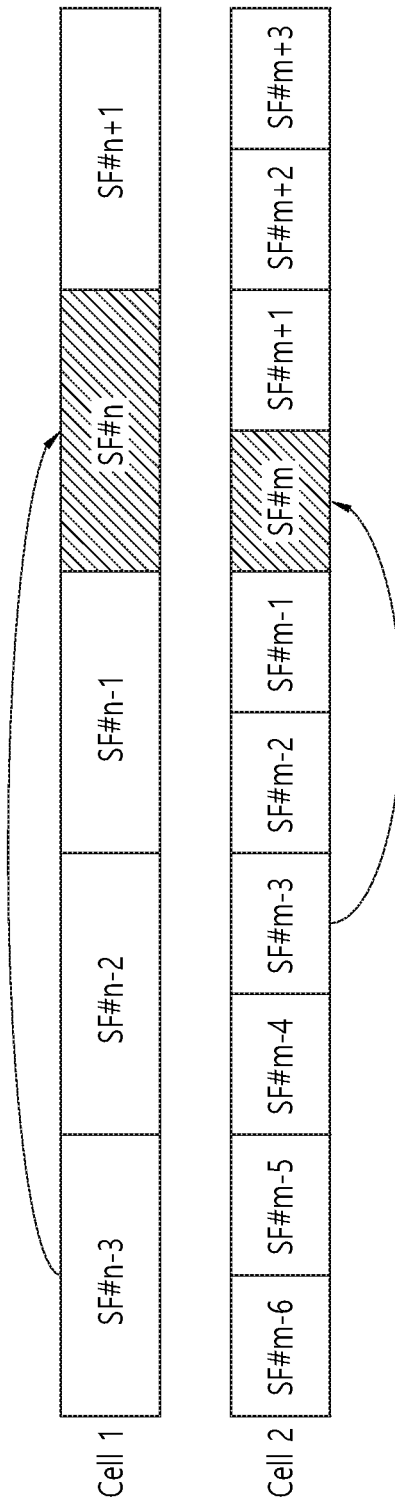
FIG. 7 shows an example for a power headroom (PH) report at different uplink (UL) scheduling timing.

FIG. 7 shows an example for a PH report at different UL scheduling timing.

A different subcarrier spacing or different slot length may be applied between a plurality of cells (or between a plurality of carriers or between a plurality of band parts). In this case, UL scheduling timing may differ between the plurality of cells. The different UL scheduling timing between the cells may result in ambiguous PH calculation.

For example, assume that a cell 1 has a subcarrier spacing of 15 kHz, and a cell 2 has a subcarrier spacing of 30 kHz. An OFDM symbol length of the cell 1 is twice an OFDM symbol length of the cell. 2, and a subframe length of the cell 1 is also twice that of the cell 2. Upon receiving first UL scheduling in a subframe (SF) # n−3 of the cell 1, the wireless device transmits a first PUSCH based on the first UL scheduling in an SF # n of the cell 1. Upon receiving second UL scheduling in an SF # m−3 of the cell 2, the wireless device transmits a second PUSCH based on the second UL scheduling in an SF # m of the cell 2. When the wireless device calculates a PH in the SF # n of the cell 1, it may be difficult to consider second PUSCH transmission of the cell 2. This is because the wireless device may have an insufficient processing time for PH calculation when new PUSCH transmission is scheduled after the SF # n−3.

Alternatively, even if UL slots between two carriers have the same length, since a scheduling timing for UL transmission of the two carriers for the same slot varies, it may be difficult to consider UL transmission through another carrier to a PH for one carrier in a corresponding slot.

When slot lengths are different from one another, this may mean that the number of OFDM symbols included in a slot varies. Since the two cells have different slot lengths, a plurality of slots of one cell may overlap with one slot of another cell.

Therefore, second PUSCH transmission scheduled after a time at which the first PUSCH is scheduled (or a time prior by a specific time to a time of transmitting the first PUSCH) may not be considered for the PH computation of the first PUSCH. Alternatively, the PH may be computed by assuming that second PUSCH transmission scheduled after a time at which the first PUSCH is scheduled (or a time prior by a specific time to a time of transmitting the first PUSCH) is not second PUSCH transmission scheduled in practice but second PUSCH transmission of a predetermined format. For example, assume that a UL grant-to-PUSCH timing value which is configured in the cell 1 of the first PUSCH for reporting the PH is 3 SFs. When calculating the PH of the first PUSCH transmitted in the SF # n, the wireless device may ignore another PUSCH transmission scheduled after the SF # n−3.

In addition, it is proposed to calculate and report a PH by using at least one of the following schemes when a slot in which a PUSCH for including PHR is transmitted overlaps with a plurality of slots of another cell due to a different slot length between cells (when the SF # m and SF # m+1 of the cell 2 overlaps with the SF # n of the cell 1, and the PHR is reported through the PUSCH transmitted in the SF # n of the cell 1 in the example of FIG. 7).

(i) The PH is calculated for a plurality of slots of the cell 2, overlapping with a slot (or subframe) of the cell 1 for reporting the PH.

(ii) The PH is calculated only for slot(s) in which a PUSCH (or other UL signals) is transmitted among the plurality of slots of the cell 2, overlapping with the slot of the cell 1 for reporting the PH.

(iii) The PH is calculated only for slot(s) in which a PUSCH (or other UL signals) is transmitted among the plurality of slots of the cell 2, overlapping with the slot of the cell 1 for reporting the PH. For the remaining slots, only a PH considering a case where no signal is transmitted in the cell 2 is calculated and reported.

(iv) The PH is calculated only for a specific slot (e.g., a first slot, a last slot, an initial second slot, a second slot from the end) among the plurality of slots of the cell 2, overlapping with the slot of the cell 1 for reporting the PH.

(v) The PH is calculated for the slot of the cell 2, overlapping with an n-th OFDM symbol (e.g., n=1) on which the first PUSCH of the cell 1 is transmitted, when the PH for the cell 2 is reported through the first PUSCH transmitted in the cell 1. Alternatively, the PH is calculated for the slot of the cell 2, overlapping with an (n−r1)-th OFDM symbol and an (n+r2)-th OFDM symbol. Herein, r1 and r2 are integers satisfying r1, r2>=0.

(vi) A plurality of schemes may be applied according to a priority among the schemes (i) to (v). For example, in a case where a PUSCH is transmitted through a plurality of slots of the cell 2 when the scheme (ii) is applied, one slot may be selected from among the plurality of slots by applying the scheme (iv) and the scheme (v).

The above schemes may also be applied to report not only a PH for a PUSCH transmitted in the cell 2 but also a PH for a case where another physical channel such as PUCCH/SRS or the like is transmitted.

The above schemes may be applied to determine whether to report a PH for a specific physical channel transmitted through the cell 2 not only for a case where a transmission enabled period of a physical channel of the cell 2 is divided into a plurality of periods in a slot period of the cell 1 due to a different slot length between the cell 1 and the cell 2 but also for a case where a plurality of physical channels are transmitted through different symbols in one slot of the cell 2. That is, the plurality of slots of the cell 2 may be applied by replacing them to a plurality of physical channels transmitted in the cell 2.

Although the above scheme is described for the cell 1 and the cell 2, the same may also be applied to PH calculation in a carrier 1 and a carrier 2 or a band part 1 and a band part 2.

Now, a PH report considering a timing advance (TA) between cells or carriers is proposed.

Figure 8:
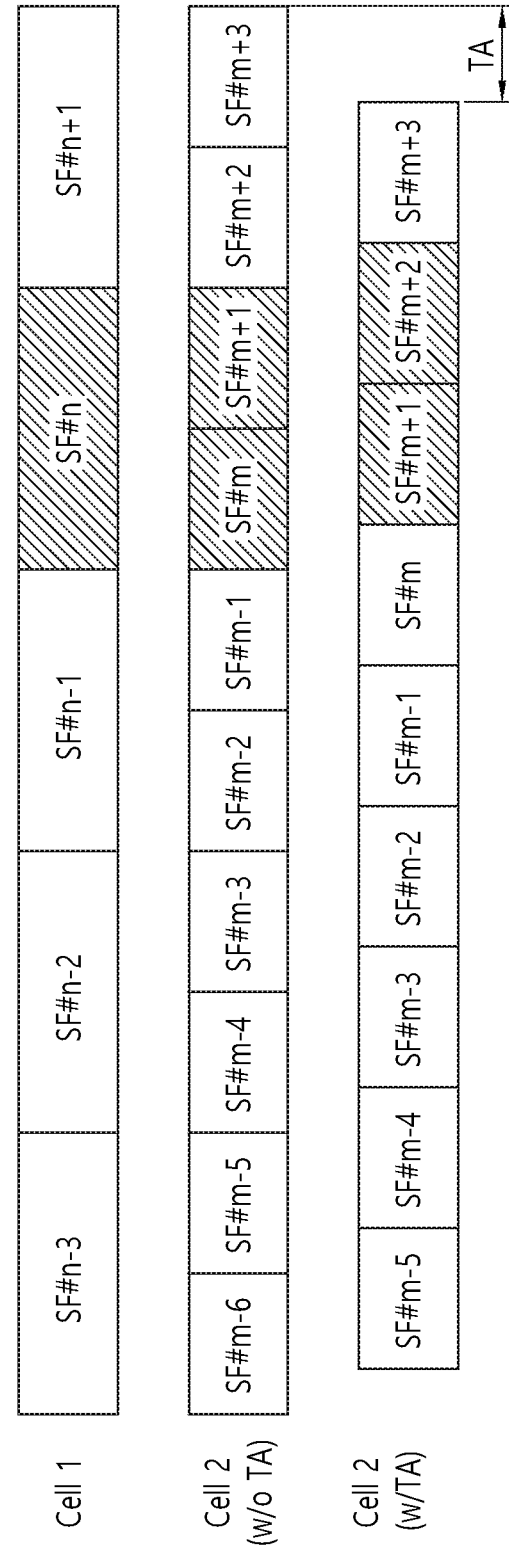
FIG. 8 shows an example of PH calculation based on whether a timing advance (TA) is applied between cells.

FIG. 8 shows an example of PH calculation based on whether a TA is applied between cells.

If different TAs are applied to a cell 1 and a cell 2, an SF of the cell 2, which overlaps with an SF of the cell 1, may vary depending on whether to apply the TA. As shown in FIG. 8, the SF of the cell 2, overlapping with an SF # n of the cell 1, may vary depending on whether to apply the TA. If the TA is not applied to the cell 2, an SF # m and SF # m+1 of the cell 2 overlap with the SF # n of the cell 1. When the TA is applied to the cell 2, an SF # m+1 and SF # m+2 of the cell 2 overlap with the SF # n of the cell 1 at a greater ratio, compared with the SF # m. In this case, which SF will be considered in a PH report may become ambiguous. Therefore, at least one of the following schemes may be applied.

(i) When an SF boundary (or slot boundary) is not aligned between different cells and when a PH reported through the SF # n of the cell 1 considers UL transmission through the cell 2, the PH is calculated by considering only transmission in an SF overlapping at the greatest ratio among SFs of the cell 2, overlapping with the SF # n of the cell 1.

(ii) The PH is calculated by considering transmission in all SFs overlapping when assuming a case where a TA is not applied between different cells. In the example of FIG. 8, the PH is calculated and reported by considering transmission of the SF # n of the cell 1 and the SF # m and SF # m+1 of the cell 2.

(iii) The PH is calculated by considering transmission of SFs overlapping at a ratio greater than a specific ratio when the TA is applied between the different cells. In the example of FIG. 8, the PH is calculated and reported by considering transmission of the SF # n of the cell 1 and the SF # m+1 and SF # m+2 of the cell 2.

When the PH is reported through a PUSCH transmitted at the slot # n of the cell 1, PH calculation based on the embodiment of FIG. 7 described above may be applied to the slot of the cell 2, overlapping with the slot # n of the slot.

Now, a PH report based on semi-persistent scheduling (SPS) transmission in an unlicensed band is proposed.

The unlicensed band is a band in which various communication protocols coexist, and which guarantees a shared use. The unlicensed band may include the 2.5 GHz and/or 5 GHz bands used by a wireless local area network (WLAN). A cell operating in the unlicensed band is also referred to as an unlicensed cell or a licensed-assisted access (LAA) cell. The LAA cell is generally a secondary cell which is activated by a primary cell, and thus is also referred to as an LAA SCell. Basically, in the unlicensed band, it is assumed that a channel is secured through competition between communication nodes. Therefore, communication in the unlicensed band performs channel sensing and thus requires to determine whether another communication node does not perform signal transmission. For convenience, this is referred to as listen before talk (LBT), and a case of determining that another communication node does not perform signal transmission is defined that clear channel assessment (CCA) is confirmed.

General PUSCH transmission is performed non-periodically according to dynamic scheduling of the BS. SPS transmission means that the wireless device periodically transmits a PUSCH without additional signaling, after a periodic time/frequency resource (called an SPS resource) for transmitting the PUSCH is predetermined. The wireless device transmits the PUSCH through the SPS resource in the presence of UL data to be transmitted in an SPS transmission period. The wireless device does not perform the PUSCH if there is no UL data to be transmitted in the SPS transmission period.

The LBT is also applied to SPS transmission in the unlicensed cell. Therefore, even if the wireless device has UL data to be transmitted in the SPS transmission period, the PUSCH cannot be transmitted if another node occupies a wireless channel. In this case, assume that a PUSCH to be transmitted through a corresponding SPS resource is an SPS PUSCH. Also, assume that a cell 1 is a licensed cell operating in a licensed band, and a cell 2 is an unlicensed cell. When a PH is reported through a PUSCH transmitted in an SF # n of the cell 1, an SPS PUSCH may have to be considered together in an SF # n of the cell 2. Since whether to transmit the SPS PUSCH is determined according to an LBT result in an SF # n of the cell 2, it may be difficult to calculate the PH by considering PUSCH transmission in the cell 1 and SPS PUSCH transmission of the cell 2 together in the SF # n. Therefore, the following schemes are proposed.

(i) The wireless device calculates the PH by assuming that the SPS PUSCH is not always transmitted regardless of whether the SPS PUSCH of the cell 2 is transmitted in practice.

(ii) The wireless device calculates the PH by assuming that the SPS PUSCH is always transmitted regardless of whether the SPS PUSCH of the cell 2 is transmitted.

(iii) The wireless device calculates the PH by assuming that a PUSCH of a predetermined format is transmitted regardless of whether the SPS PUSCH of the cell 2 is transmitted. If an available RB count/arrangement, modulation and coding scheme (MCS) or the like is predetermined through an SPS resource, the wireless device may calculate the PH by assuming a corresponding parameter.

Meanwhile, an NR system may use an SC-FDM scheme or an OFDM scheme with a waveform for PUSCH transmission, which is called an SC-FDM PUSCH or an OFDM PUSCH. In order to report a plurality of PHs for a plurality of waveforms, a representative PH and a PH offset are reported to reduce a signaling overhead. In the presence of a PH1 for the SC-FDM PUSCH and a PH2 for the OFDM PUSCH, one of the PH1 and the PH2 may be selected as the representative PH, and a PH offset representing a difference between the selected PH and the remaining PHs may be calculated. Although there is no restriction in a criterion for selecting the representative PH, a PH for a waveform transmitted in practice may be selected as the representative PH.

A representative maximum TX power and power offset for the selected waveform may also be reported when maximum TX power is reported for a plurality of waveforms. The maximum TX power means maximum power that can be used by the wireless device when a UE transmits a corresponding waveform.

The PH offset (and/or power offset) may be reported together with the representative PH or may be reported with a slower period than the representative PH. If a difference between a PH offset previously reported and a current PH offset is greater than a specific value, the PH offset may be reported. When a specific time elapses after a PH offset reported last, the PH offset may be reported. If an MCS used in PUSCH transmission is different by at least a specific level in comparison with an MCS used in a PUSCH reported previously, the PH offset may be reported. The wireless device may report the PH offset while an RRC configuration required for PUSCH transmission is established/reconfigured.

Since a power backoff value required to transmit different waveforms may be less affected by PUSCH scheduling, the wireless device may inform the BS of the power backoff value required to transmit the different waveforms or a power backoff value between the two waveforms. A reference environment (e.g., PUSCH bandwidth, PUSCH RB allocation, MCS, etc.) for calculating the power backoff offset value may be predetermined. The wireless device may report a power backoff offset value for different reference environments.

OFDM PUSCH transmission may have a greater inter-cell interference or intra-cell interference than SC-FDM PUSCH transmission. Therefore, a value $P_{CMAX}$ which is configured to restrict the maximum TX power of the wireless device may be configured independently for each waveform. A value $P_{CMAX}$ for one waveform may be configured as an offset of the value $P_{CMAX}$ for another waveform. $P_{CMAX}$ of the SC-FDM PUSCH may be configured to be greater than $P_{CMAX}$ of the OFDM PUSCH.

Different TX power may be applied to a reference signal (RS) and UL data required to adjust a target block error rate (BLER) according to a code rate or a modulation order in OFDM PUSCH transmission. In addition, when uplink control information (UCI) and UL data are transmitted together on a PUSCH, the UCI and the UL data may require different TX power. In a first embodiment, a TX power difference between the RS and the UL data may be determined based on a combination of the code rate and the modulation order. The smaller the code rate or the greater the modulation order, the greater the RS TX power than TX power of the UL data may be configured. In a second embodiment, DCI for scheduling the PUSCH may indicate a TX power difference between the RS and the UL data or may include a parameter capable of calculating the TX power difference. In a third embodiment, a TX power difference between UCI and the UL data may be determined based on a combination of a data code rate and a UCI code rate. The smaller the data code rate than the UCI code rate, the greater the UCI TX power than the data TX power may be configured. In a fourth embodiment, DCI for scheduling the PUSCH may indicate a TX power difference between the UCI and the UL data, or may include a parameter capable of calculating the TX power difference.

Now, power control based on an access band of a wireless device is described.

An NR system may be configured such that a BS covers a wide system frequency band, and a wireless device operates only in a part of the system frequency band. The part of the band is called a band part or a bandwidth part (BWP). The BS may transmit a broadcast channel (BCH) which carries a DL synchronization signal and system information in each of a plurality of BWPs within the system band. Even a BWP in which the synchronization signal is transmitted may not provide all of system information required for the wireless device to have access the BS. For convenience, the BWP is called a non-accessible BWP. A BWP in which the synchronization signal and all of the system information are transmitted may be called an accessible BWP. The wireless device may obtain DL synchronization through the accessible BWP, and thereafter may read the remaining system information by moving a frequency band to the accessible BWP according to the system information on a BCH of the non-accessible BWP, and may establish a connection with the BS.

An additional physical cell ID is not assigned to the BWP, and the BWP may be dynamically switched through DCI such that DL/UL communication can be performed only in one BWP at a time. A technical reason for introducing a plurality of BWPs in one cell is for scheduling data through a different BWP according to a service required every moment by allowing a different numerology (e.g., subcarrier spacing, OFDM symbol length, etc.), an HARQ delay, power control, or the like to be configured for each service of the wireless device. In addition, the BS may configure a plurality of BWPs having different bandwidths to the wireless device and communicate with the wireless device in various BWPs according to a traffic amount, thereby improving power saving and frequency efficiency. It is also possible to consider a usage in which a different beam is configured for each BWP, and a beam is switched naturally by switching the BWP.

UL power control may be applied independently for each BWP. An independent UL power control parameter may be configured for each BWP, and an independent closed-loop UL power control may be applied.

For each BWP, there may be a need to adjust an amount of interference having effect on a neighboring cell or adjust a quality target for receiving a UL signal. The BS may configure a UL power control parameter for each BWP. The UL power control parameter may include at least one of a TX power offset value of each physical channel (e.g., PUSCH, PUCCH, SRS) and allowed maximum TX power $P_{CMAX}$. Information on the UL power control parameter may be broadcast or may be transferred through device-specific signaling.

A default UL power control parameter value may be configured for a default BWP, and the parameter value may be configured in an offset form for the default UL power control parameter as to the remaining BWPs. Alternatively, the default UL power control parameter may be configured regardless of the BWP, and the parameter value may be configured in a form of an offset for the default UL power control parameter as to the remaining BWPs.

To compensate for fast fading between the BWPs, the BS may send an independent closed loop power control command for each BWP. Accordingly, the wireless device may adjust independent TX power for each BWP.

$P_{CMAX}$ may be configured independently for each BWP. The wireless device may report the PH and the $P_{CMAX}$ for each BWP. The wireless device may report a default PH and default $P_{CMAX}$ for a default BWP, and may report an offset value for the PH and the $P_{CMAX}$ for the remaining BWPs.

A plurality of serving cells (or a plurality of carriers) may be configured to the wireless device, and each serving cell may provide a plurality of BWPs. In a transmission period q, $P_{CMAX,c}$ may be given to a serving cell, and $P_{CMAX,c,i}$ may be given to a BWP i in the serving cell c. In the transmission period q, UL TX power of the wireless device is adjusted not to exceed $P_{CMAX,c,i}$, and is adjusted such that total UL TX power of the BWPs in the serving cell c does not exceed $P_{CMAX,c}$. The wireless device may adjust the total TX power not to exceed $P_{CMAX,total}$ simultaneously in all service cells. $P_{CMAX,total}$ may be configured by the BS, or may be defined by maximum TX power capability of the wireless device.

The total TX power of the plurality of UL channels to be transmitted simultaneously in the plurality of BWPs may be considered to use lower TX power in any one of the plurality of UL channels according to a priority or to discard any one transmission among the plurality of UL channels. The priority may be designated for each BWP. The wireless device may preferentially reduce the TX power of the UL channel in a BWP having a lower priority, rather than a BWP having a higher priority, or may discard transmission. The priority may be designated by the BS through RRS signaling or the like, or may be defined according to an attribute (e.g., bandwidth, subcarrier spacing, symbol duration, etc.) of the BWP.

As shown in Equation 1 and Equation 2, PL(i) is a parameter used to calculate a PH and UL TX power by using a DL path loss estimation value calculated by the wireless device. When the wireless device performs UL transmission through the BWP, the DL path loss may be measured to determine UL path loss compensation to the BS, which may be assumed as being equivalent to the UL path loss. The wireless device may measure a DL reference signal received power (RSRP) through a synchronization signal or RS transmitted through a reference BWP, and may compare the measured DL RSRP and TX power of the synchronization signal/RS to measure the DL path loss. The reference BWP for measuring the DL path loss among the plurality of BWPs configured to the wireless device may be measured as follows.

(i) The BS may designate the reference BWP through RRC signaling.

(ii) One of BWPs assigned to the wireless device for data transmission may be designated by the wireless device as the reference BWP.

(iii) When a non-accessible BWP is assigned for data communication, the wireless device may designate an accessible BWP as the reference BWP. The accessible BWP may be designated by the BS or may be determined by a predetermined rule. For example, an accessible BWP closest to the non-accessible BWP may be designated.

The reference for measuring the DL path loss may be designated independent of the BWP for data communication. The reference BWP may mean a frequency band or center frequency for transmitting a synchronization signal or RS that can be used in the DL path loss measurement.

Figure 9:
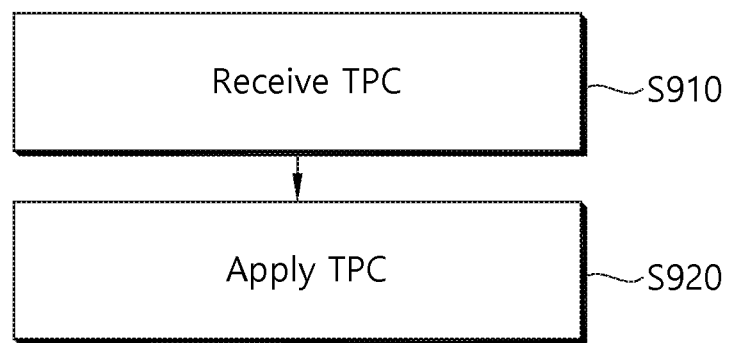
FIG. 9 shows a transmit (TX) power control method according to an embodiment of the present disclosure.

FIG. 9 shows a TX power control method according to an embodiment of the present disclosure.

In step S910, a wireless device receives a transmit power command (TPC) for adjusting TX power of a UL channel (PUSCH/PUCCH/SRS). In step S920, the wireless device controls UL TX power by applying the received TPC.

The TPC may be included in DCI for scheduling the UL channel or TPC-dedicated DCI for transmission of a plurality of wireless device (or a plurality of UL channels). The DCI may further include a delay field related to a transmission timing at which the UL channel is actually transmitted.

Figure 10:
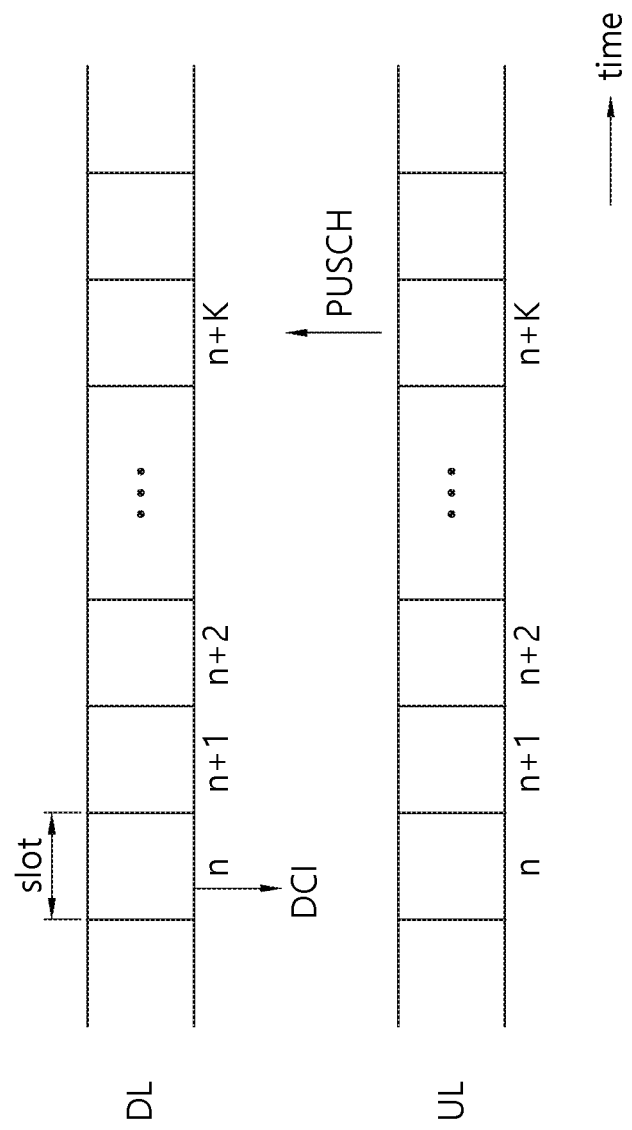
FIG. 10 shows an example of UL channel scheduling having a delay field.

FIG. 10 shows an example of UL channel scheduling having a delay field. Upon receiving scheduling DCI at a slot n, a scheduled UL channel is transmitted at a slot n+K. The delay field in the DCI includes information indicating K. K may just indicate a minimum delay capable of transmitting a UL channel, and the UL channel may not be necessarily transmitted at the slot n+K. A slot-based K is for exemplary purposes only, and a subframe or OFDM symbol or sub-slot based K may also be possible.

Figure 11:
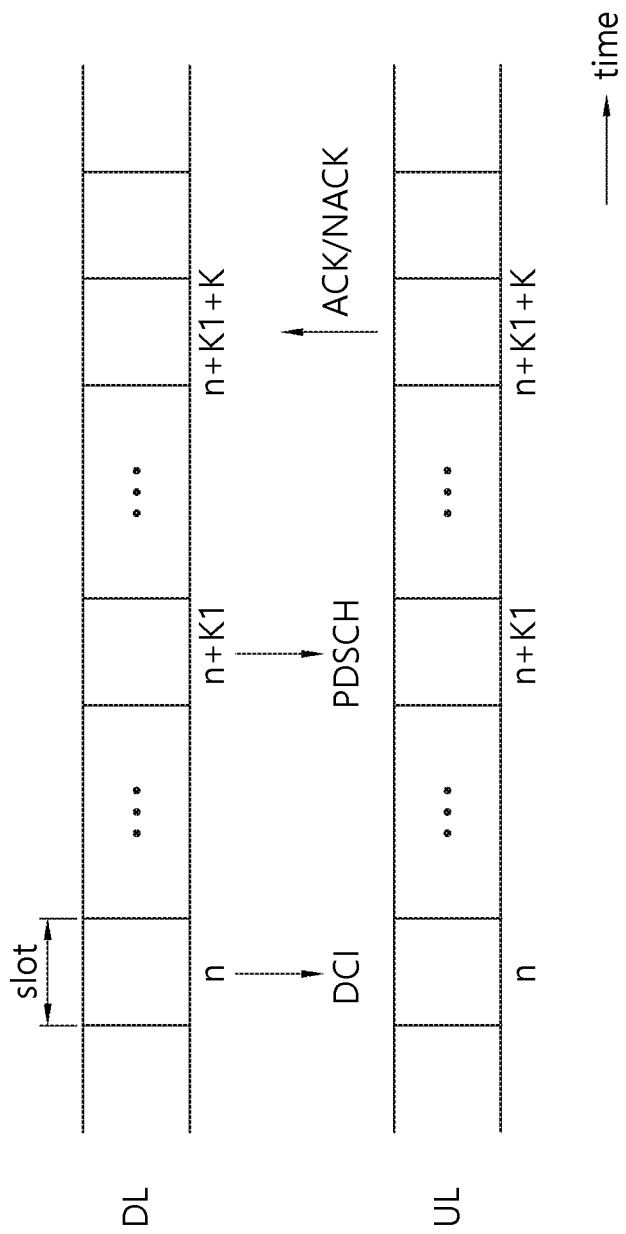
FIG. 11 shows an example of a UL feedback having a delay field.

FIG. 11 shows an example of a UL feedback having a delay field. DCI received at a slot n triggers PDSCH reception at a slot n+K1. At a slot n+K1+K, an HARQ feedback (e.g., ACK/NACK) corresponding to the PDSCH is triggered. The delay field in the DCI of the slot n may include information regarding K. K indicates only a minimum delay capable of transmitting a feedback, and the feedback may not be necessarily transmitted at the slot n+K. A slot-based K is for exemplary purposes only, and a subframe or OFDM symbol or sub-slot based K may also be possible.

In an embodiment, it is assumed that the value K defined by the delay field ranges from Kmin to Kmax. If the wireless device receives DCI having TPC at a slot n, the TPC may be applied from a slot n+Kmin or a slot n+Kmax. Upon receiving the DCI having the TPC at the slot n, the TPC may be applied from a slot n+K (Kmin<=K<=Kmax) or after the slot n+K. The DCI may additionally include the delay field, or may include only the TPC. If a plurality of delay fields are given, the TPC may be applied from a minimum value or a maximum value among the plurality of values K. If the plurality of delay fields are given, the TPC may be applied from "minimum value+offset" or "maximum value+offset" among the plurality of values K. The offset may be greater than or equal to 1.

In another embodiment, upon receiving the DCI at the slot n, the TPC may be applied from a slot n+Knm1. Knm1 may be a fixed value. n+Knm1 may be a value common to all wireless devices in a cell, or may be a value given to each wireless device. This operation may be applied only when the DCI does not include the delay field.

In another embodiment, upon receiving the DCI having the TPC at the slot n, the TPC may be applied from a slot n+Knm2. Knm2 may be a value given according to capability of the wireless device. Knm2 may be a value corresponding to a minimum time or maximum time capable of transmitting a scheduled UL channel from a slot in which the DCI is received according to the capability of the wireless device. Knm2 may be "minimum time+offset" or "maximum time+offset". The offset may be greater than or equal to 1. This operation may be applied only when the DCI does not include the delay field.

In the above proposals, the values K, Kmin, Kmax, Knm1, and Knm2 may be expressed in any time unit, for example, an OFDM symbol unit or a slot unit. A timing n for receiving a PDCCH (or PDSCH) may also be expressed not in a slot unit but in any time unit, and may be, for example, a last OFDM symbol in which the PDCCH (or PDSCH) is received.

Now, a DCI format for TPC transmission is proposed.

A plurality of independent closed loop power control (CL-PC) processes may be configured to apply independent power control for different beams or different services or the like with respect to PUSCH/PUCC/SRS transmission. In addition, group TPC DCI may be defined to transmit TPC for one or more wireless devices.

Assume that the TPC for one CL-PC process has m bits, and a payload of the group TPC DCI has N*m bits. Therefore, the group TPC DCI has N TPC fields. The BS may inform the wireless device of a location of a TPC field having the TPC of the wireless devices among the N TPC fields through RRC signaling or the like.

Assume that a TPC field for mixed TPC for a plurality of CL-PC processes has n bits (n>=m). For example, the mixed TPC may include information for the TPC or CL-PC process to which the TPC is applied. If n is a multiple of m, the mixed TPC for each CL-PC process may be expressed by a plurality of m-bit TPC fields. That is, assume that m=2 and n=4. If a group TPC DCI payload consists of 20 bits, 10 TPC fields in the group TPC DCI may be grouped into 5 groups, and thus each group may represent the mixed TPC. A location of a TPC field for each of the plurality of CL-PC processes may be reported to the wireless device having the plurality of CL-PC processes. Alternatively, a location of a TPC field for a first CL-PC process among the plurality of CL-PC processes may be reported, and TPC of the remaining CL-PC processes may be obtained from the consecutive TPC fields. For example, assume that four CL-PC processes are allocated to the wireless device, and a location of the allocated TPC field corresponds to an index 3. The wireless device may recognize that four TPC fields consecutive from a TPC field having an index 3 represent TPC for four CL-PC processes.

Figure 12:
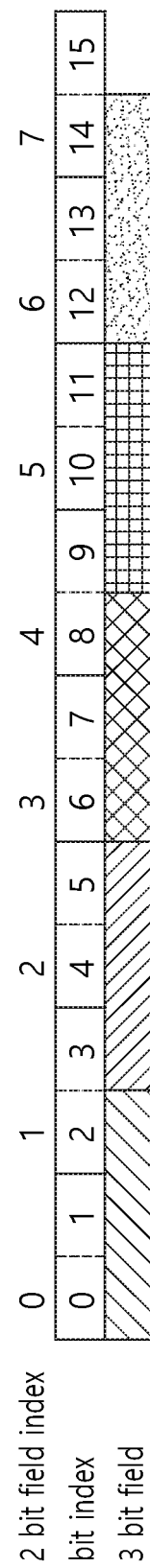
FIG. 12 shows a problem caused by the use of the existing transmit power command (TPC).

FIG. 12 shows a problem caused by the use of the existing TPC.

If n is not a multiple of m, it is difficult to report a TPC field to a wireless device in which a plurality of CL-PC processes are configured on the basis of an m-bit TPC field. For example, assume that one TPC field consists of 2 bits (m=2), and a mixed TPC consists of 3 bits (n=3) including a 1-bit CL-PC process ID and a 2-bit TPC. A location of the 3-bit TPC field cannot be correctly reported with an index of the existing 2-bit TPC field.

In an embodiment, if n is not a multiple of m, a location of the mixed TPC is not based on the location of the m-bit TPC field. Instead, the location of the mixed TPC in the DCI format is expressed by a bit index. In the example of FIG. 12, a location of a field of $2^{nd}$ and $3^{rd}$ bits may be expressed by a bit index 3. Alternatively, when an n-bit TPC field and m-bit TPC field can be combined in any order within the DCI, the location of the m-bit TPC field may be reported based on the bit index.

Figure 13:
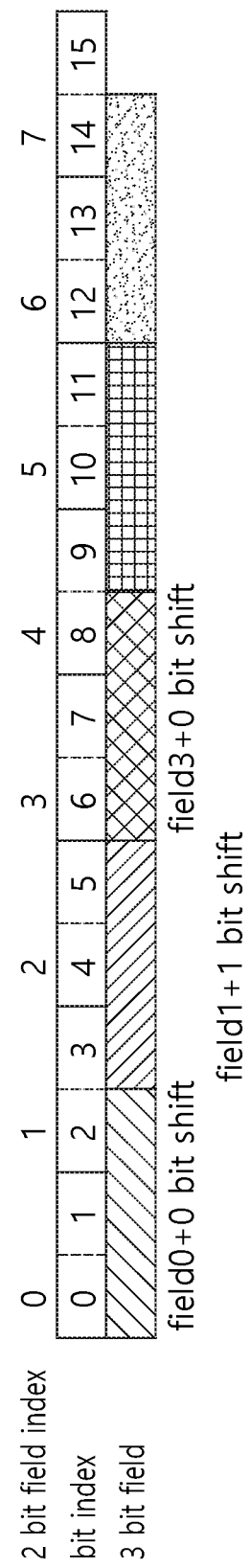
FIG. 13 shows an example of proposed group TPC downlink control information (DCI).

FIG. 13 shows an example of proposed group TPC DCI.

If n is not a multiple of m, a location of an n-bit TPC field may be expressed by an index of an m-bit TPC field and a bit shift value. Assume that group TPC DCI has 8 2-bit TPC fields, and has field indices 0 to 7. A location of a 3-bit TPC field may be expressed by an index of a 2-bit TPC field and a k-bit shift. Herein, 0<=k<=(n−m). Alternatively, when an n-bit TPC field and m-bit TPC field can be combined in any order within the DCI, the location of the m-bit TPC field may be reported based on the bit index.

Figure 14:
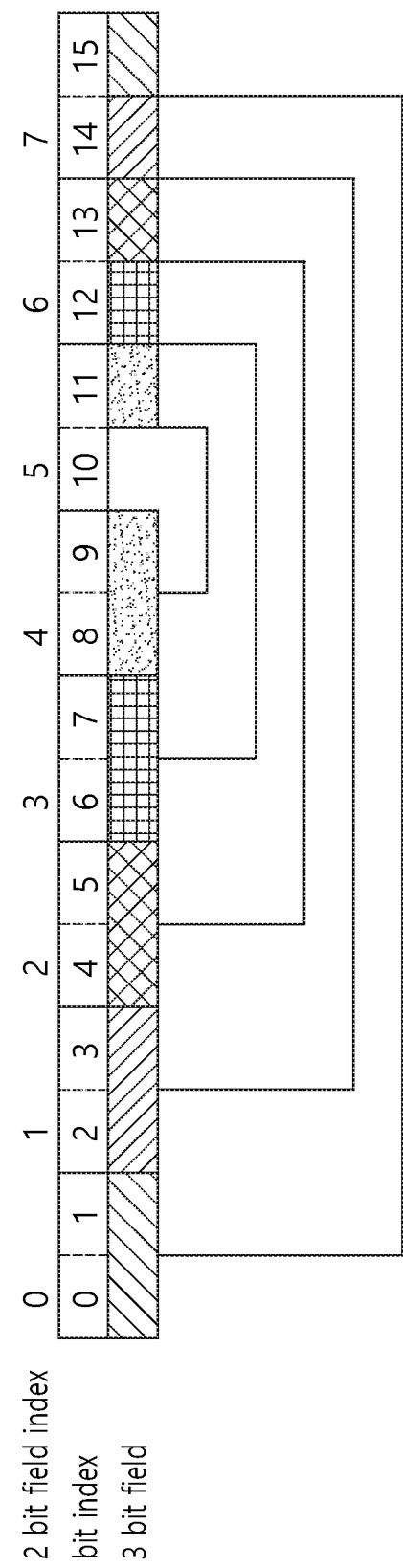
FIG. 14 shows another example of proposed group TPC DCI.

FIG. 14 shows another example of proposed group TPC DCI.

If n is not a multiple of m, a start location of m bits in an n-bit TPC field may be reported based on an index of an m-bit TPC field, and a location of the remaining (n-m) bits may be determined by a combination of a DCI payload size P and a corresponding 2-bit TPC field index. For example, the location of the 2-bit TPC field index may be reported for a 3-bit TPC field, and the remaining 1 bit may be expressed by a (16-K)-th bit. In general, a location of the remaining (n−m) bits may be recognized based on a P−K*(n−m)-th bit, and P may indicate a size excluding a padding bit in a payload of a DCI format.

Figure 15:
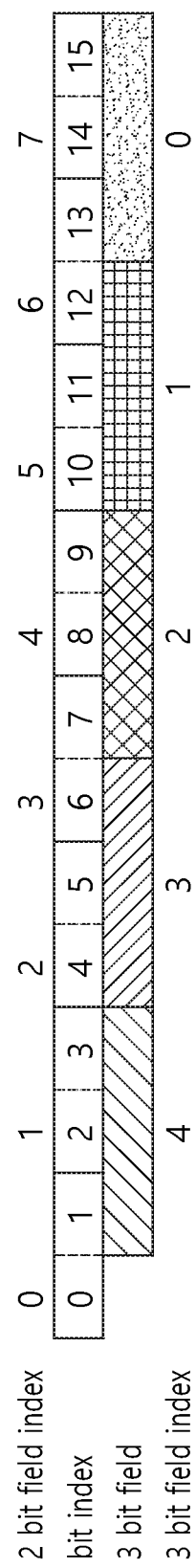
FIG. 15 shows another example of proposed group TPC DCI.

FIG. 15 shows another example of proposed group TPC DCI.

If n is not a multiple of m, a start location of an n-bit TPC field is reported as an n-bit TPC bit index, and the n-bit TPC field index is determined as a relative location with respect to a last location according to a DCI payload size P. For example, when five 3-bit TPC fields have indices 0 to 4, a 3-bit TPC field index may be defined in a reverse direction from a last bit of a 16-bit DCI payload (i.e., a direction opposite to a direction in which a 2-bit TPC field index is given). On the contrary, an m-bit TPC field index may start from a last bit, and an n-bit TPC field index may start from a first bit. In this case, a TPC payload may mean a size except for a padding bit. P may denote a size except for a padding bit of a payload of a DCI format.

Figure 16:
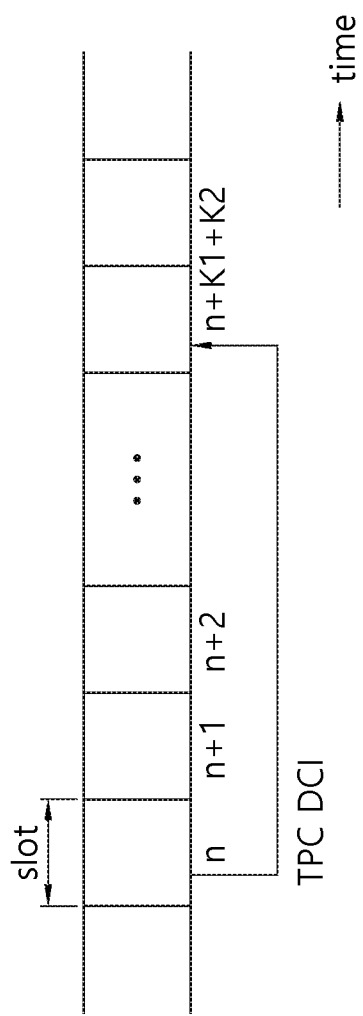
FIG. 16 shows an example of a timing applied after receiving TPC DCI.

FIG. 16 shows an example of a timing applied after receiving TPC DCI.

Upon receiving TPC DCI (or group TPC DCI) having TPC at a slot n, a wireless device may apply the TPC at a slot n+K1+K2. In an embodiment, K1 may be a fixed value. K1 may be a value common to all wireless devices in a cell, or may be a value given to each wireless device. In another embodiment, K1 may be a value given according to capability of the wireless device. K1 may be a value corresponding to a minimum time or maximum time capable of applying the TPC from a slot in which the TPC DCI is received according to the capability of the wireless device. K2 is an offset value, and may be 0, 1, or higher. The values K1 and K2 may be expressed in any time unit, for example, an OFDM symbol unit or a slot unit. A timing n for receiving a PDCCH which carries the TPC DCI may also be expressed not in a slot unit but in any time unit, and may be, for example, a last OFDM symbol in which the PDCCH is received.

Now, a scheme of testing and controlling UL TX power will be described. When BF is performed using multiple antenna arrays in a high frequency band above 24 GHz, if one antenna array includes many antenna elements with great density, it may be difficult to measure TX power of a wireless device between a power amp and an antenna connector. Therefore, in order to test whether UL power control is correctly performed, it may be easier to measure TX power output from an antenna directly over the air.

The wireless device receives a DL signal transmitted by the BS through an RX beam having a direction and directive gain formed by the wireless device. The wireless device measures RX power of the DL signal, and measures a path loss from the BS. It is assumed that the measured path loss is compensated for, while transmitting a UL signal to the BS through a TX beam having the same or similar direction and directivity gain. The measured path loss PL may include a path loss component L over the air and an antenna gain component D caused by an RX beam, and may be defined as PL=L−D_dl. Since it is difficult for the wireless device to separate only the component L, a path loss compensation component is −(L−D_dl) in TX power. If a TX antenna directivity gain component D_ul is added thereto, −L+D_dl+D_ul is added to the TX power. If D_dl=D_ul, the result is −L+2D_dl, which leads to a problem in that an antenna gain is considered twice. Therefore, in order to correctly compensate for the path loss, it may be more effective to apply UL power control to TX power at an antenna connector, rather than emitter isotropic radio power (EIRP) measured over the air. The TX power measured at the antenna connector is called transmit radio power (TRP).

Therefore, a scheme of testing TRP and a power control may be performed as follows, when UL power control is applied based on the TRP of the wireless device. This scheme may be equally applied to a TRP test of the BS or other wireless nodes.

An antenna gain Di is obtained for a beam form and beam direction formed by the wireless device. i is an index indicating the beam form and the beam direction. First, in order to test whether a desired TRP is output for the beam i or whether the TRP does not exceed a defined maximum TRP, EIRP for a beam i is measured through OTA. The TRP for the beam i may be expressed by EIRP-Di or EIRP-Di±e. e is a value considering an error tolerance. Therefore, in the test for TX power, whether the TRP satisfies a TX power requirement may be tested by assuming the TRP as a value obtained by subtracting the estimated value Di(+−e) from an EIRP measurement value. This test may be performed for a plurality of predetermined beams i. In order to perform UL power control on the TRP in practice, the values Di may be reported in advance to the BS. The BS may refer and utilize the value Di to configure a target value or the like for the TRP. The values Di may be an absolute value or an offset value for an antenna gain of a specific beam. In addition, this scheme may also be equally applied to a TRP test of the BS or other wireless nodes.

Figure 17:
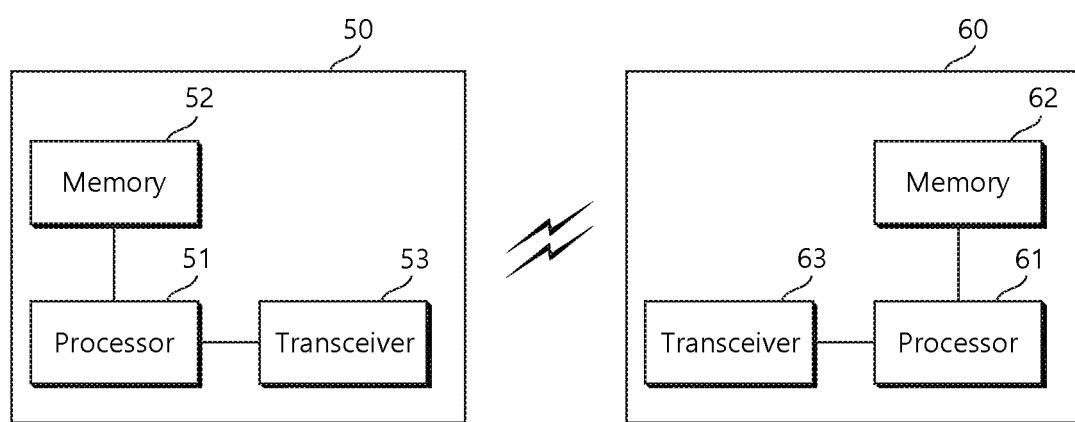
FIG. 17 is a block diagram showing a wireless communication system for which an embodiment of the present disclosure is implemented.

FIG. 17 is a block diagram showing a wireless communication system for which an embodiment of the present disclosure is implemented.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method for controlling an uplink transmit power in a wireless communication system, the method performed by a wireless device comprising:
configuring a range for defining a delay field, the delay field being included in downlink control information for scheduling an uplink transmission and indicating a slot offset at which the uplink transmission is to be performed, wherein a value K of the delay field ranges from Kmin to Kmax;
receiving a transmit power command (TPC) at slot n;
adjusting an uplink transmit power of an uplink channel based on the TPC; and transmitting the uplink channel by applying the uplink transmit power at a slot which is obtained based on a value of Kmin.

2. The method of claim 1, wherein the uplink channel is a physical uplink shared channel (PUSCH) or a sounding reference signal (SRS).

3. The method of claim 1, wherein uplink channel is transmitted at slot n+Kmin.

4. The method of claim 1, wherein the TPC is received in downlink control information for scheduling an uplink transmission at slot n+K.

5. The method of claim 1, wherein one slot includes a plurality of orthogonal frequency division multiplexing (OFDM) symbols.

6. A device for a wireless communication system, the device comprising:
  a processor; and
  a memory operatively coupled with the processor and configured to store instructions that, when executed by the processor, cause the device to perform functions comprising:
    configuring a range for defining a delay field, the delay field being included in downlink control information for scheduling an uplink transmission and indicating a slot offset at which the uplink transmission is to be performed, wherein a value K of the delay field ranges from Kmin to Kmax;
    receiving a transmit power command (TPC) at slot n;
    adjusting an uplink transmit power of an uplink channel based on the TPC; and
    transmitting the uplink channel by applying the uplink transmit power at a slot which is obtained based on a value of Kmin.

7. The device of claim 6, wherein the uplink channel is a physical uplink shared channel (PUSCH) or a sounding reference signal (SRS).

8. The device of claim 6, wherein uplink channel is transmitted at slot n+Kmin.

9. The device of claim 6, wherein the TPC is received in downlink control information for scheduling an uplink transmission at slot n+K.

10. The device of claim 6, wherein one slot includes a plurality of orthogonal frequency division multiplexing (OFDM) symbols.

* * * * *